(12) United States Patent
Bering et al.

(10) Patent No.: US 11,021,053 B2
(45) Date of Patent: Jun. 1, 2021

(54) WORK VEHICLE WITH COMMODITY TANK AND A COMMODITY TANK FOR A WORK VEHICLE

(71) Applicant: DEERE & COMPANY, Moline, IL (US)

(72) Inventors: Christopher A. Bering, Dike, IA (US); Chad N. Hogan, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 16/158,864

(22) Filed: Oct. 12, 2018

(65) Prior Publication Data
US 2020/0114801 A1 Apr. 16, 2020

(51) Int. Cl.
| | |
|---|---|
| *B60K 15/073* | (2006.01) |
| *A01M 7/00* | (2006.01) |
| *B60P 3/22* | (2006.01) |
| *A01C 23/00* | (2006.01) |
| *B60P 3/30* | (2006.01) |
| *B62D 55/065* | (2006.01) |
| *B62D 25/16* | (2006.01) |
| *B60K 15/07* | (2006.01) |

(Continued)

(52) U.S. Cl.
CPC .......... *B60K 15/073* (2013.01); *A01C 23/008* (2013.01); *A01M 7/0085* (2013.01); *B60K 15/07* (2013.01); *B60P 3/2215* (2013.01); *B60P 3/30* (2013.01); *B62D 25/16* (2013.01); *B62D 55/065* (2013.01); *B60K 2015/03118* (2013.01); *B60K 2015/0638* (2013.01); *B60Y 2200/221* (2013.01); *B60Y 2400/106* (2013.01); *B60Y 2410/10* (2013.01)

(58) Field of Classification Search
CPC .......................... B60K 15/073; A01M 7/0085
See application file for complete search history.

(56) References Cited

U.S. PATENT DOCUMENTS

| | | | | |
|---|---|---|---|---|
| 3,396,983 A | * | 8/1968 | Massey | B62D 49/06 280/830 |
| 3,794,131 A | * | 2/1974 | Freedman | B62M 27/02 180/184 |
| 4,480,845 A | | 11/1984 | Hansen | |

(Continued)

FOREIGN PATENT DOCUMENTS

| | | |
|---|---|---|
| DE | 19730825 A1 | 8/1998 |
| DE | 102007046678 A1 | 4/2009 |

(Continued)

OTHER PUBLICATIONS

German Search Report issued in counterpart application No. 102019213708.3 dated Jun. 23, 2020 (8 pages).

(Continued)

*Primary Examiner* — Kevin Hurley
(74) *Attorney, Agent, or Firm* — Tucker Ellis LLP

(57) ABSTRACT

A work vehicle and a commodity tank configured for mounting on a work vehicle and storing material are provided. The commodity tank includes an inboard portion extending vertically and configured to be positioned at an inboard location of the work vehicle. The commodity tank further includes an outboard portion extending horizontally from an upper end of the inboard portion and configured to extend at least partially over a ground-engaging member of the work vehicle.

21 Claims, 7 Drawing Sheets

(51) Int. Cl.
*B60K 15/063* (2006.01)
*B60K 15/03* (2006.01)

(56) References Cited

U.S. PATENT DOCUMENTS

| | | | |
|---|---|---|---|
| D282,921 S | 3/1986 | Eureka | |
| D433,425 S | 11/2000 | Surridge | |
| D435,503 S | 12/2000 | Gukeisen | |
| D441,710 S | 8/2001 | Moehle | |
| 6,550,811 B1 | 4/2003 | Bennett | |
| D484,893 S | 1/2004 | Hsiao | |
| 6,742,612 B2 * | 6/2004 | Campbell | B62M 27/02 180/53.4 |
| D551,153 S | 9/2007 | Oury | |
| D562,350 S | 2/2008 | Higashikawa | |
| D564,431 S | 3/2008 | Orr | |
| D588,054 S | 3/2009 | Xi-Ren | |
| 7,523,804 B2 * | 4/2009 | Tanaka | B60K 15/073 180/291 |
| D644,160 S | 8/2011 | Fries | |
| D644,161 S | 8/2011 | Fries | |
| D647,166 S | 10/2011 | Kimball | |
| D655,372 S | 3/2012 | Kimball | |
| D656,520 S | 3/2012 | Ortlund | |
| 8,172,268 B2 * | 5/2012 | Komorida | B60K 15/073 280/830 |
| D663,325 S | 7/2012 | Thunstrom | |
| D669,099 S | 12/2012 | Ringer | |
| D694,167 S | 11/2013 | Forsberg | |
| D695,202 S | 12/2013 | Forsberg | |
| D713,424 S | 9/2014 | Gonzales | |
| D728,632 S | 5/2015 | Klassen | |
| D728,633 S | 5/2015 | Klassen | |
| D772,773 S | 11/2016 | Andersen | |
| D775,238 S | 11/2016 | Roemer | |
| D773,773 S | 12/2016 | Ethington et al. | |
| 9,586,634 B2 * | 3/2017 | Buchanan | B62D 55/02 |
| D792,479 S | 7/2017 | Sasaki | |
| D803,756 S | 11/2017 | Andersen et al. | |
| 9,884,662 B2 * | 2/2018 | Eavenson, Sr. | B62D 55/02 |
| 10,526,031 B2 * | 1/2020 | Freytag | B62D 63/04 |
| D891,336 S | 7/2020 | Bering et al. | |
| 2003/0015536 A1 * | 1/2003 | Tekulve | B60K 15/067 220/562 |
| 2018/0273142 A1 * | 9/2018 | Mangum | B62D 55/10 |
| 2020/0108714 A1 * | 4/2020 | Selvaraj | B60K 15/067 |
| 2020/0262488 A1 | 8/2020 | Bering et al. | |
| 2020/0262498 A1 | 8/2020 | Bender et al. | |
| 2020/0282826 A1 * | 9/2020 | Moore | B60K 15/073 |

FOREIGN PATENT DOCUMENTS

| | | |
|---|---|---|
| DE | 102009009817 A1 | 8/2010 |
| DE | 102012109085 A1 | 3/2014 |
| DE | 102017201425 A1 | 8/2017 |
| DE | 102017118762 A1 | 2/2019 |
| DE | 102017217391 A1 | 4/2019 |
| EP | 0860350 B1 | 8/2003 |

OTHER PUBLICATIONS

Non-Final Office Action for related U.S. Appl. No. 29/666,463, dated Jun. 25, 2020. 8 pages.

Specification and Figures for related unpublished U.S. application for Fender for Work Vehicle, U.S. Appl. No. 29/680,663, filed Feb. 19, 2019. 21 Pages.

Specification and Figures for related unpublished U.S. application for Vehicle Tank, U.S. Appl. No. 29/666,463, filed Oct. 12, 2018. 8 Pages.

Specification and Figures for related unpublished U.S. application for Commodity Tank for a Work Vehicle, U.S. Appl. No. 29/726,030, filed Feb. 28, 2020. 36 Pages.

Specification and Figures for related unpublished U.S. application for Work Vehicle With Support Device for Mounting a Commodity Tank and Support Device Mounting a Commodity Tank to a Work Vehicle, U.S. Appl. No. 16/805,137, filed Feb. 28, 2020. 51 Pages.

* cited by examiner

WORK VEHICLE WITH COMMODITY TANK AND A COMMODITY TANK FOR A WORK VEHICLE

BACKGROUND OF THE DISCLOSURE

A work vehicle, such as a tractor to name a non-limiting example, may travel in a work area, such as a field of crops to name a non-limiting example, while applying a material to the work area, such as the spraying, injecting, or otherwise dispensing of a fertilizer, nutrient, herbicide, pesticide, and/or other material to soil, a plant, and/or row(s) of crops to name non-limiting examples. The work vehicle may carry, tow, or otherwise be connected to a commodity tank to store the material and may be capable of spraying, injecting, dispensing, or otherwise utilizing the material or applying the material at the work area. Conventional commodity tanks may be cylindrical containers that are generally mounted to the work vehicle at raised, outboard locations to avoid interference with wheels or other ground-engaging structures of the work vehicle or the work tools or implements of the work vehicle. However, the mounting location of conventional commodity tanks may undesirably raise the center of gravity of the work vehicle and adversely affect the maneuverability and accessibility of the work vehicle due to decreased stability and increased overall width and/or length of the work vehicle. Further, such conventional commodity tanks often obstruct the visibility of the operator and reduce the operator's ease of access to and from the operator station.

Therefore, there is a need in the art for a commodity tank that improves the maneuverability and accessibility of a work vehicle without obstructing operator visibility or impeding access to the operator station of the work vehicle.

SUMMARY OF THE DISCLOSURE

In an embodiment of the present disclosure, a work vehicle is provided having a work vehicle body, at least one track assembly at least partially supporting the work vehicle body and having a track assembly upper profile, and at least one commodity tank configured to store material and having a lower surface spaced from the at least one track assembly along the track assembly upper profile.

In an embodiment of the present disclosure, a commodity tank configured for mounting on a work vehicle and storing material is provided. The commodity tank includes an inboard portion extending vertically and configured to be positioned at an inboard location of the work vehicle, and an outboard portion extending horizontally from an upper end of the inboard portion and configured to extend at least partially over a ground-engaging member of the work vehicle.

In an embodiment of the present disclosure, a commodity tank for storing material on a tracked work vehicle and extending over a track assembly having a track assembly upper profile is provided. The commodity tank includes a lower surface configured to face an endless track of the track assembly of the tracked work vehicle and being spaced from the endless track along the track assembly upper profile, and an upper surface configured for mounting adjacent to an operator station of the tracked work vehicle.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
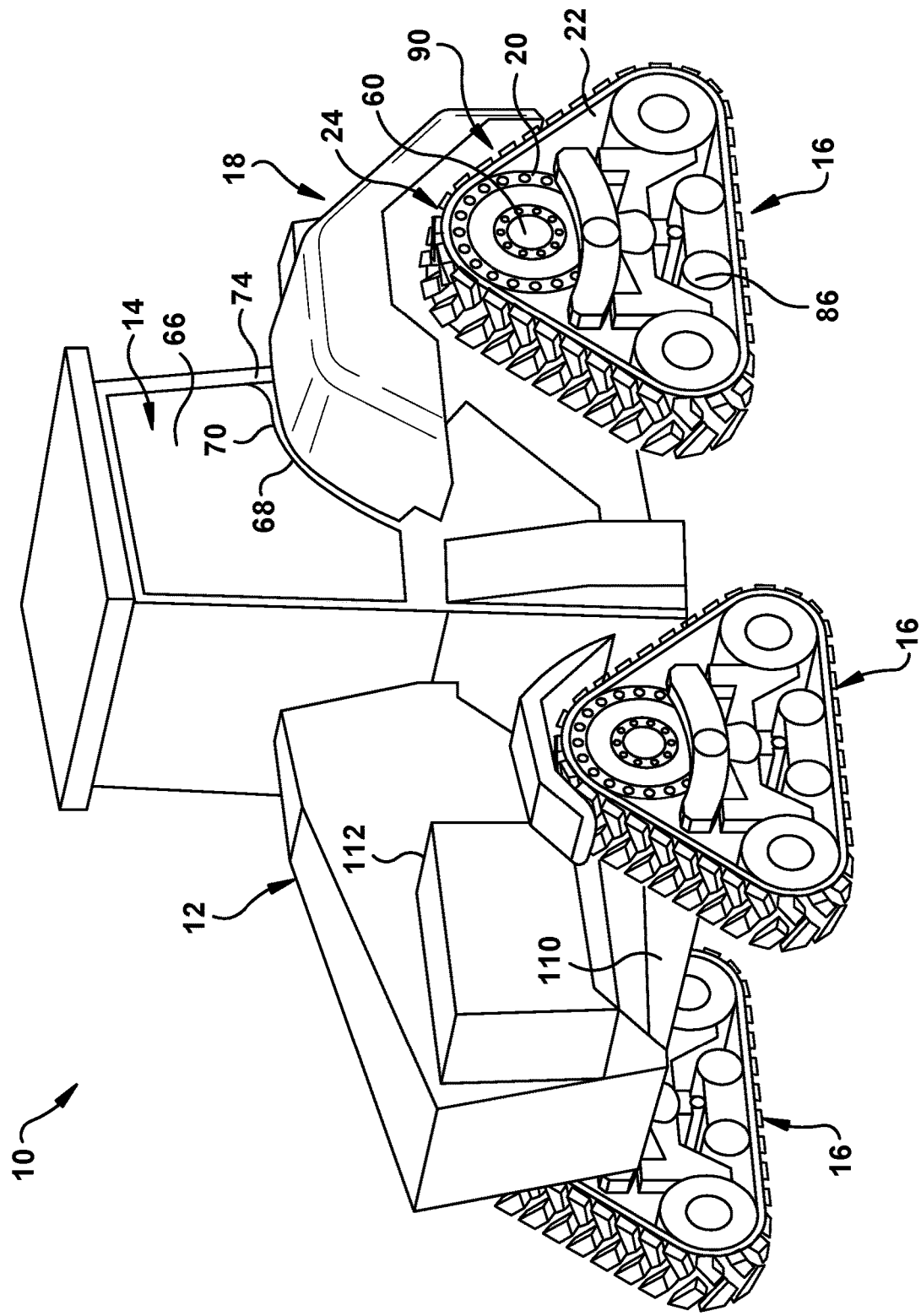
FIG. 1 is a perspective view of a work vehicle and a commodity tank in accordance with an embodiment of the present disclosure.

Referring to FIG. 1, a work vehicle 10 is illustrated in accordance with an embodiment of the present disclosure. The work vehicle 10 includes a work vehicle body 12 having a work vehicle frame 110 and an engine or other power source 112. The work vehicle 10 further includes an operator station 14, and a plurality of track assemblies 16. Although the vehicle 10 is illustrated with four track assemblies 16, the vehicle 10 of additional embodiments of the present disclosure may include any number of track assemblies or other ground-engaging members or structures, such as wheels to name a non-limiting example, to enable movement of the vehicle 10 across a ground surface. In a further non-limiting example, the work vehicle 10 may include wheels at the front of the work vehicle 10 and the track assemblies 16 at the rear of the vehicle 10. The vehicle 10 includes at least one drive axle 60 driven by the power source 112 and driving or otherwise configured to drive the track assembly or assemblies 16 or other ground-engaging structures at the rear of the vehicle 10.

The work vehicle 10 of the illustrated embodiment further includes one or more commodity tank(s) 18 mounted or otherwise coupled to the work vehicle 10 and configured to store material, such as for application outside of the work vehicle 10 in a non-limiting example. The work vehicle 10 may further utilize the commodity tank(s) 18 for storing water or other material for ballast, stability, or weight control. Each commodity tank 18 is configured to store fertilizer, herbicide, pesticide, water, fuel, or another nutrient, chemical, or other material for storage, utilization by the work vehicle 10, and/or dispensing at or onto a work area, such as a crop field to name a non-limiting example. The illustrated embodiment includes two commodity tanks 18 as mirror images of each other relative to a vertical plane extending through a central, longitudinal axis of the work vehicle 10. However, the two commodity tanks 18 of another embodiment are not mirror images of each other. Further, additional embodiments of the present disclosure may include either a single commodity tank 18 disposed on a side of the vehicle 10 or a commodity tank 18 on both sides of the vehicle 10 and extending between the two sides of the work vehicle 10, such as behind or otherwise around the operator station 14.

Figure 2:
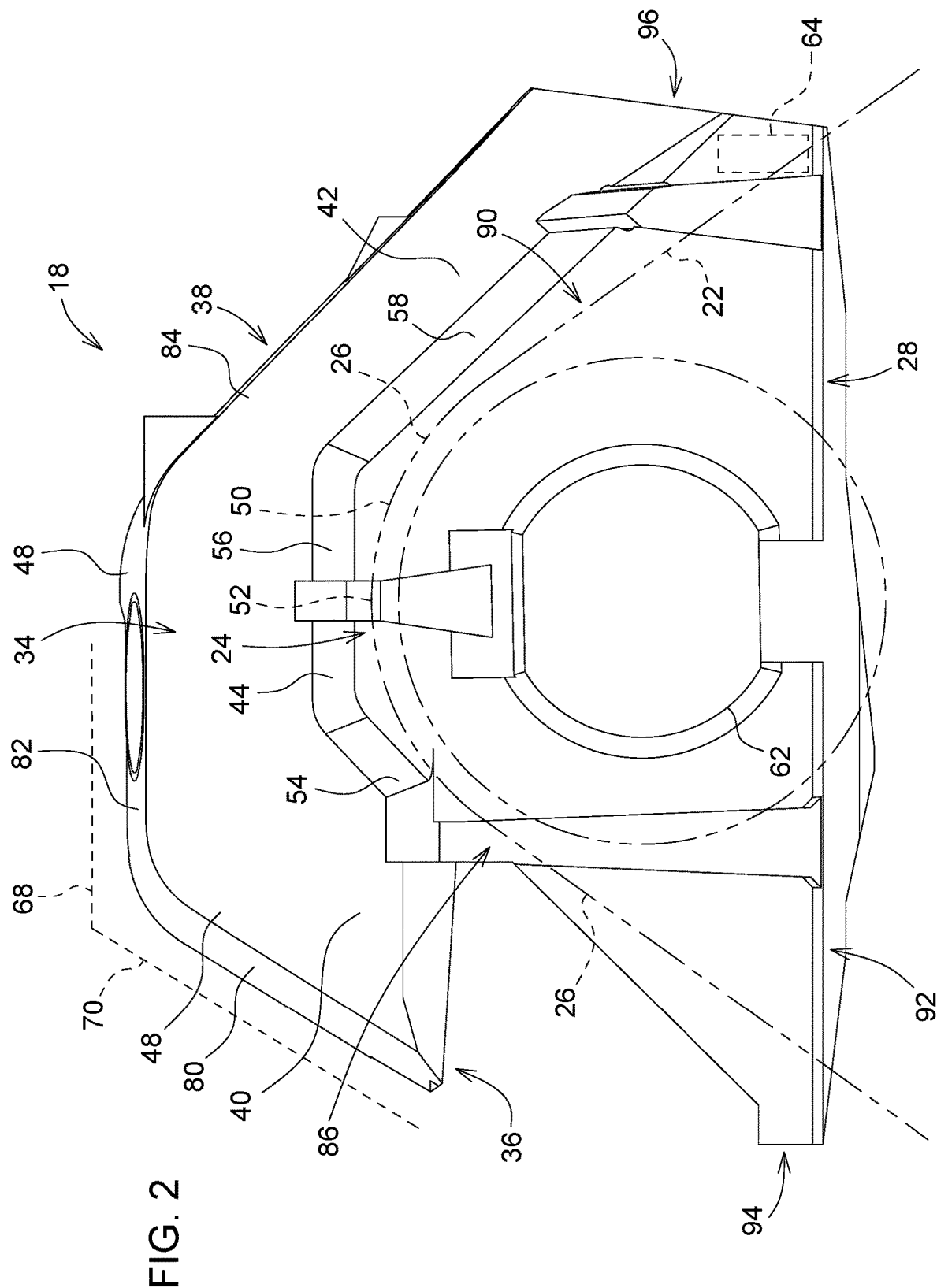
FIG. 2 is a left side elevation view of a commodity tank in accordance with an embodiment of the present disclosure.

With reference to FIG. 2 and continued reference to FIG. 1, the track assembly 16 of an embodiment of the present disclosure supports the vehicle 10, including the work vehicle body 12, the operator station 14, and/or the commodity tank(s) 18. The track assembly 16 of the illustrated embodiment is generally triangular, as defined by an endless track 22, with a main track wheel 20 disposed at an upper portion 24 of the track assembly 16. As shown in FIG. 2, the track assembly 16 includes a track assembly upper profile 26 as defined at least partially by the endless track 22 positioned at the upper portion 24 of the track assembly 16. However, the track assembly 16 of additional embodiments of the present disclosure may be configured as a different shape, include different components, and/or include a different upper profile than that illustrated in FIGS. 1 and 2. As shown in FIGS. 1 and 2, the track assembly upper profile 26 of one embodiment includes a curve 50 having a central peak 52.

Although FIGS. 2-7 illustrate only the commodity tank 18 disposed on the left side of the vehicle 10, the embodiments and descriptions provided in the present disclosure further apply to any other commodity tank of the present disclosure, including the commodity tank 18 disposed on the right side of the vehicle 10. As the commodity tank 18 on the right side of the vehicle 10 is a mirror image of the commodity tank 18 shown in FIGS. 2-7, one of ordinary skill in the art will appreciate that any structure or feature illustrated in FIGS. 2-7 may be duplicated for the commodity tank 18 on the right side as a mirror image relative to a vertical plane extending through a central, longitudinal axis of the work vehicle 10.

Figure 3:
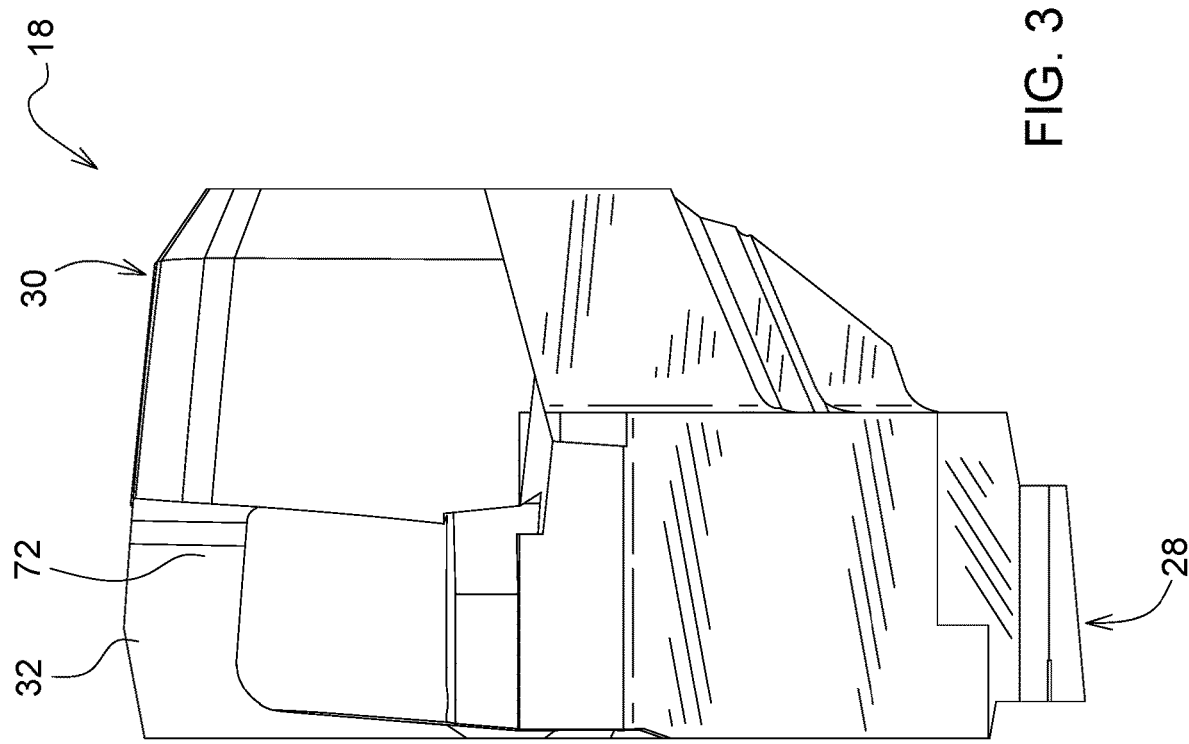
FIG. 3 is a front side elevation view of a commodity tank in accordance with an embodiment of the present disclosure.

Referring now to FIG. 3 with continuing reference to FIG. 2, the commodity tank 18 includes an inboard portion 28 extending vertically downward from an upper end 32 of the inboard portion 28. The inboard portion 28 is positioned or otherwise configured for positioning at an inboard location of the tracked work vehicle 10, as illustrated in FIG. 1. The commodity tank 18 further includes an outboard portion 30 extending horizontally from the upper end 32 of the inboard portion 28. The outboard portion 30 extends or is otherwise configured to extend at least partially over the track assembly 16 of the tracked work vehicle 10.

Figure 4:
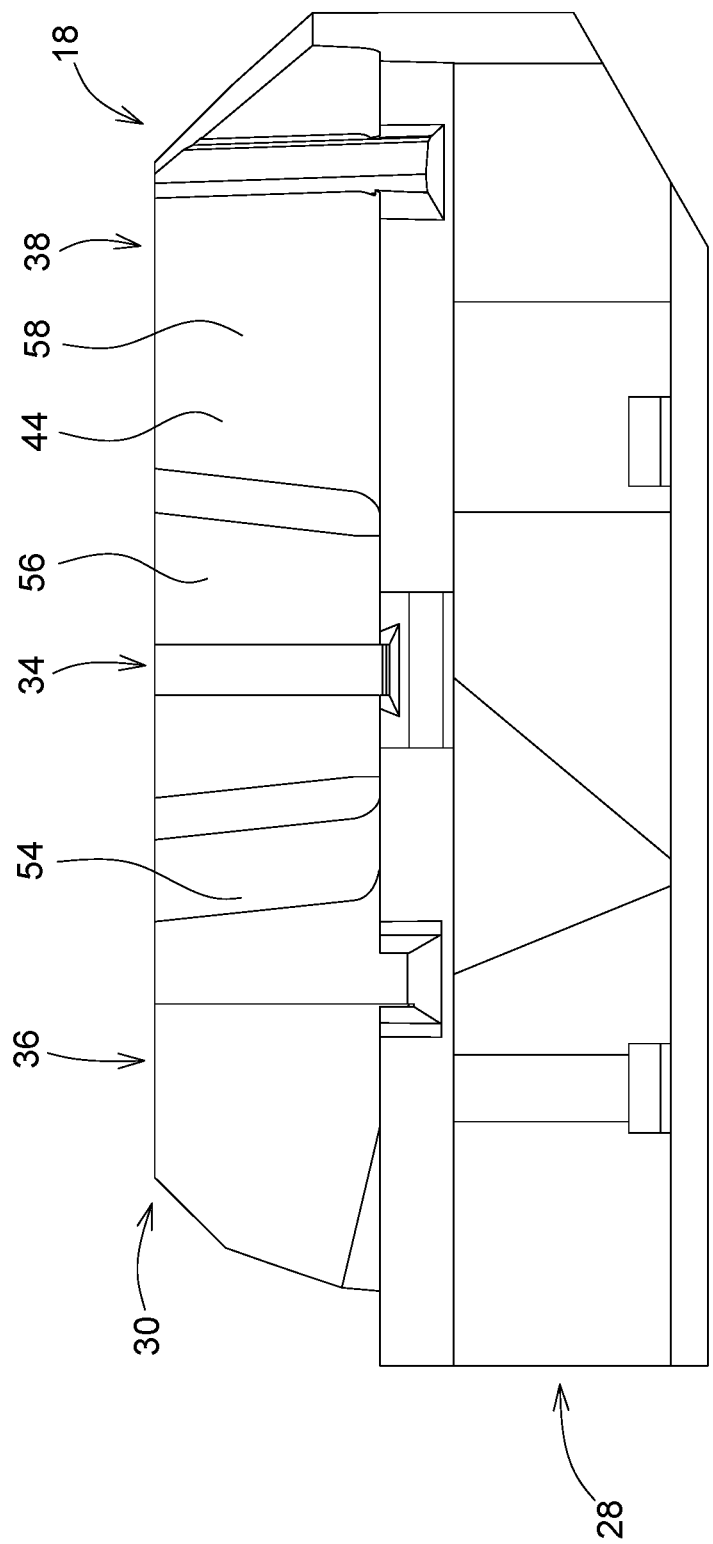
FIG. 4 is a bottom plan view of a commodity tank in accordance with an embodiment of the present disclosure.
Figure 5:
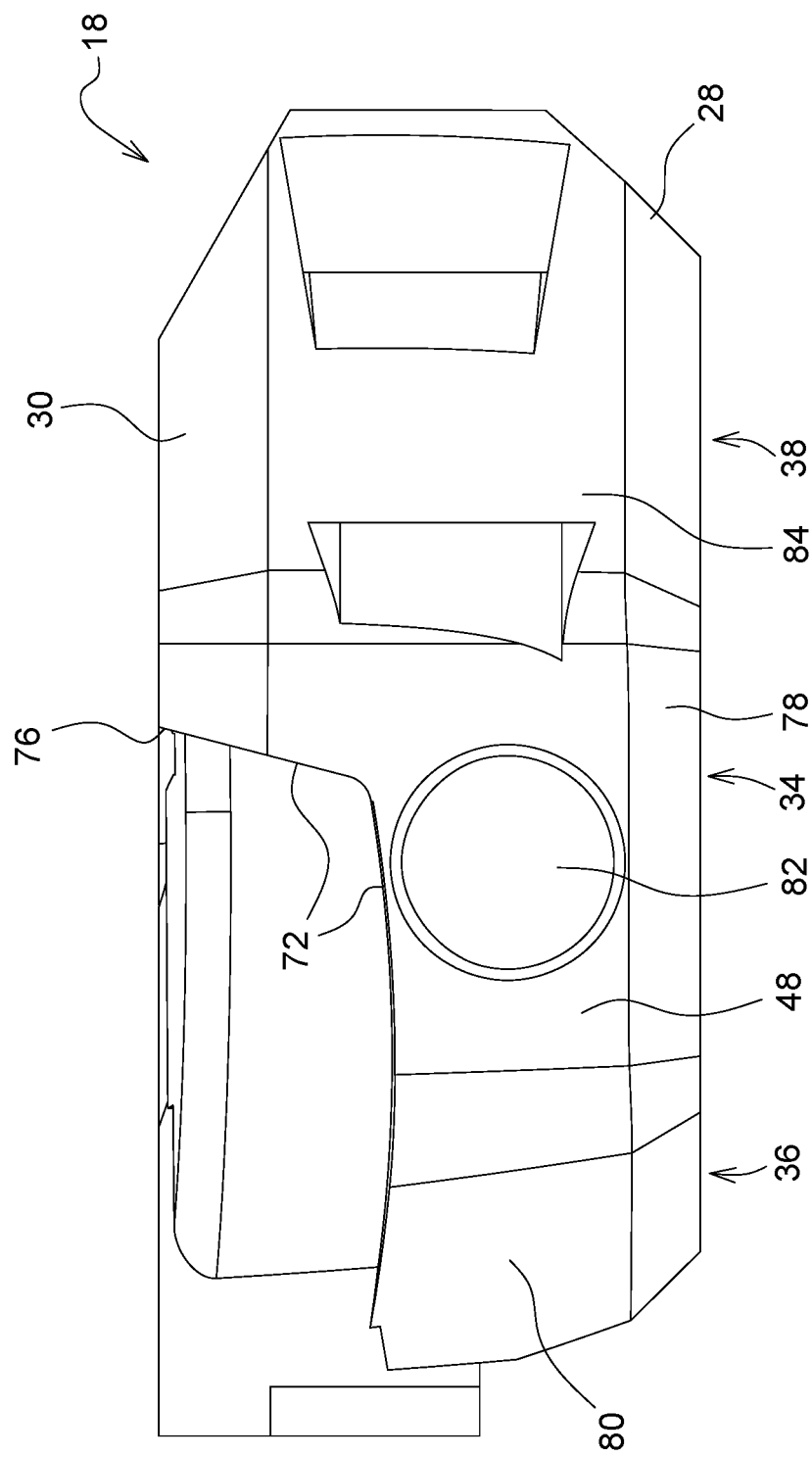
FIG. 5 is a top plan view of a commodity tank in accordance with an embodiment of the present disclosure.

FIG. 4 is a bottom plan view of the commodity tank 18, and FIG. 5 is a top plan view of the commodity tank 18. FIGS. 2, 4, and 5 illustrate the commodity tank 18 having a central portion 34, a front portion 36, and a rear portion 38. As best shown in FIGS. 1 and 2, the central portion 34 is mounted at least partially over or configured to be mounted at least partially over the central peak 52 of the track assembly 16 of the tracked vehicle 10. Further, the front portion 36 extends at least partially forward from the central portion 34. The front portion 36 includes at least one front portion surface 40 extending downward from the central portion 34. In the illustrated embodiment, the front portion surface 40 is oriented diagonally downward from the central portion 34. The rear portion 38 extends at least partially rearward from the central portion 34. The rear portion 38 includes at least one rear portion surface 42 extending downward from the central portion 34. In the illustrated embodiment, the rear portion surface 42 is oriented diagonally downward from the central portion 34.

Figure 6:
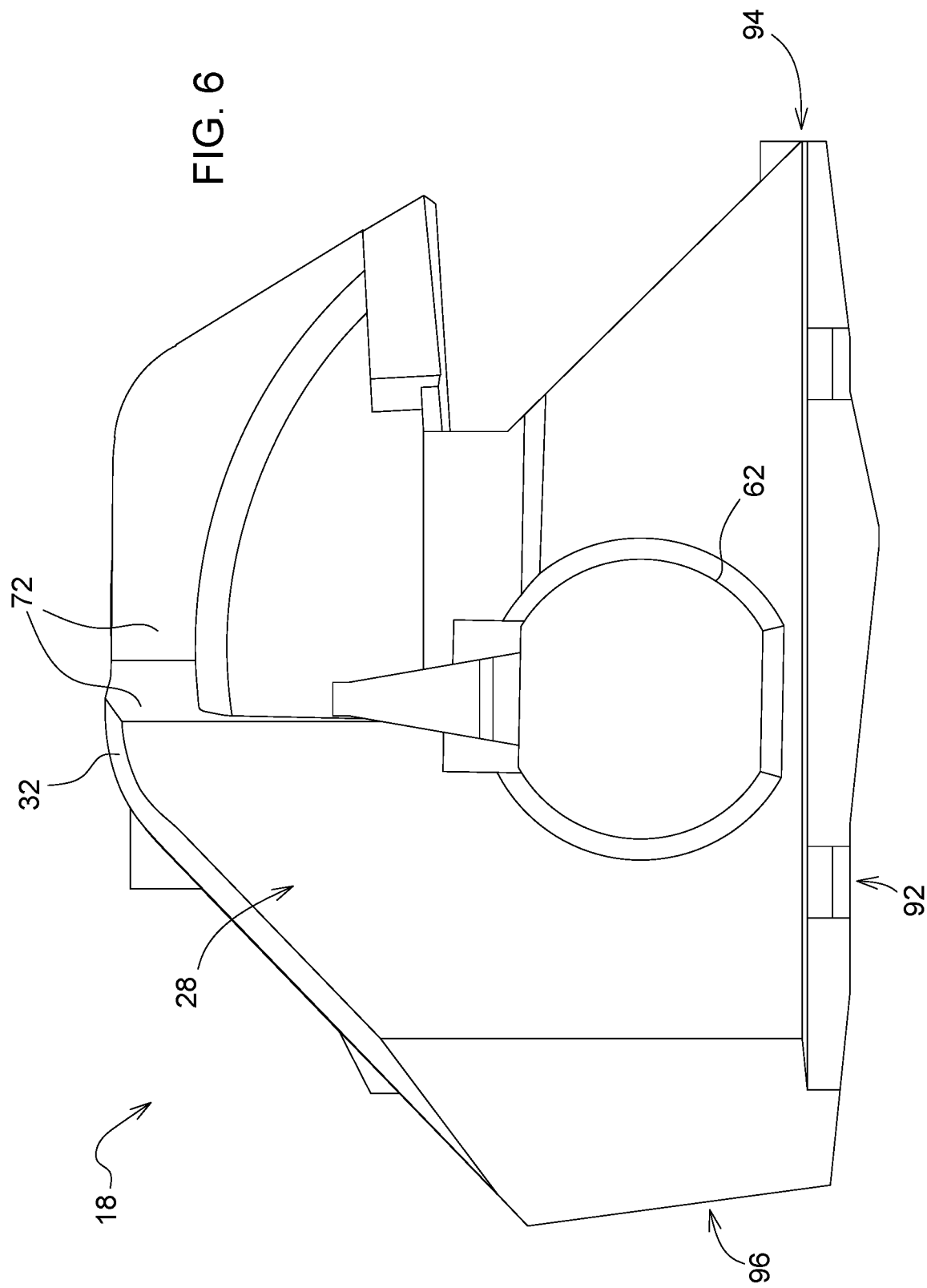
FIG. 6 is a right side elevation view of a commodity tank in accordance with an embodiment of the present disclosure.

FIG. 6 illustrates an elevation view of the commodity tank 18 from an inboard end. As described herein, the inboard end refers to an inboard side or portion disposed at a generally inboard location relative to the outer surfaces of the commodity tank 18 or vehicle 10. Similarly, another "end" identified herein may refer to a side or other portion being disposed at a relative location. As shown in FIG. 6 with reference to FIGS. 1 and 2, the commodity tank 18 includes an opening 62 disposed in the inboard portion 28. The opening 62 accommodates or is otherwise configured to accommodate the drive axle 60 of the tracked work vehicle 10 extending through the inboard portion 28. In the illustrated embodiment, the commodity tank 18 is shaped or otherwise configured to surround or otherwise occupy space around the drive axle 60 such that material stored in the commodity tank 18 may surround or otherwise occupy space around the drive axle 60. In the embodiment illustrated, the drive axle 60, including either a single axle or multiple axles independently formed, controlled, and/or driven, extends through the opening 62 of the inboard portion 28 of each of two commodity tanks 18 positioned on each side of the vehicle 10.

As best shown in FIGS. 2 and 6, the commodity tank 18 of the illustrated embodiment further includes a lower end 92 extending from a forwardmost end 94 of the commodity tank 18 to a rearwardmost end 96 of the commodity tank 18. The lower end 92 of the commodity tank 18 of the illustrated embodiment has a length equal to or greater than a length of the outboard portion 30 from the forwardmost end 94 of the commodity tank 18 to the rearwardmost end 96 of the commodity tank 18. In the illustrated embodiment, the lower end 92 of the commodity tank 18 has a length greater than the length of the outboard portion 30 from the forwardmost end 94 of the commodity tank 18 to the rearwardmost end 96 of the commodity tank.

Figure 7:
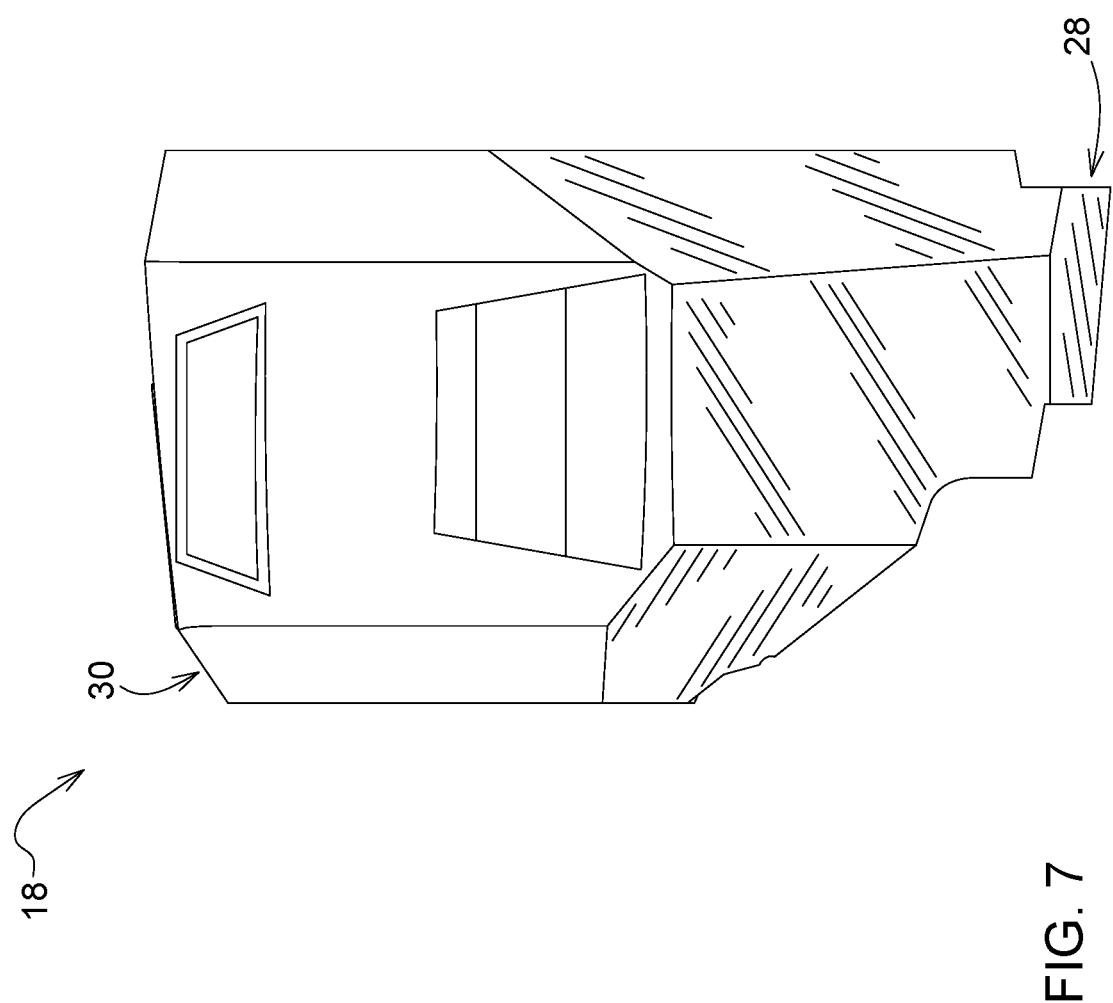
FIG. 7 is a rear side elevation view of a commodity tank in accordance with an embodiment of the present disclosure.

FIG. 7 illustrates a rear elevation view of the commodity tank 18. Although not illustrated, the commodity tank 18 of one or more embodiments of the present disclosure includes one or more lighting, signaling, wiring, marking, or other items or components coupled to the commodity tank 18, such as on a rearward-facing surface of the commodity tank 18. Further, one or more step(s), handrail(s), post(s), and/or other structural features may be included on or with the commodity tank 18 in other embodiments. Further, such lighting, wiring, signaling, marking, structural features, or other items or components may be integrated into the commodity tank 18 or integrally formed with the commodity tank 18.

Referring again to FIGS. 1 and 2, the commodity tank 18 of an embodiment includes a lower surface 44 at least partially facing the endless track 22 or is otherwise configured to at least partially face the endless track 22 of the track assembly 16 of the tracked work vehicle 10. The commodity tank 18 further includes an upper surface 48 mounted adjacent to or otherwise configured for mounting adjacent to the operator station 14. The lower surface 44 is spaced from the endless track 22 along the track assembly upper profile 26 and/or is shaped in correspondence to the track assembly upper profile 26. As best shown in FIG. 2, the lower surface 44, the upper surface 48, and/or any other part of the outboard portion 30 extends along an outboard portion profile 48 corresponding to, following the contour of, and/or complimenting the track assembly upper profile 26. In an embodiment, the outboard portion 30 at least partially wraps around the upper portion 24 of the track assembly 16. In additional embodiments not illustrated, the outboard portion 30 extends at least partially over at least part of the track assembly 16 without wrapping around any portion of the track assembly 16.

The lower surface 44 illustrated in FIGS. 2 and 4 includes a lower surface front portion 54, a lower surface central portion 56, and a lower surface rear portion 58. The lower surface front portion 54 and/or the lower surface rear portion 58 is/are disposed below the lower surface central portion 56. In the illustrated embodiment, both the lower surface front portion 54 and the lower surface rear portion 58 are disposed below the lower surface central portion 56. In an additional embodiment not illustrated, neither the lower surface front portion 54 nor the lower surface rear portion 58 is disposed below the lower surface central portion 56. The lower surface front portion 54 is spaced from or otherwise configured to be spaced from the endless track 22 along a track assembly front portion 86. The lower surface central portion 56 is spaced from or otherwise configured to be spaced from the endless track 22 along a track assembly upper portion 24. The lower surface rear portion 58 is spaced from or otherwise configured to be spaced from the endless track 22 along a track assembly rear portion 90.

The upper surface 48 illustrated in FIGS. 2 and 5 includes an upper surface front portion 80, an upper surface central portion 82, and an upper surface rear portion 84. The upper surface front portion 80 and/or the upper surface rear portion 84 is/are disposed below the upper surface central portion 82. In the illustrated embodiment, both the upper surface front portion 80 and the upper surface rear portion 84 are disposed below the upper surface central portion 82. In an additional embodiment not illustrated, neither the upper surface front portion 80 nor the upper surface rear portion 84 is disposed below the upper surface central portion 82.

The operator station 14 of the work vehicle 10 includes one or more window(s) 66 or other openings through which the operator observes the operation of the work vehicle 10, any attached or cooperating work tool or vehicle, and/or the surrounding work area, as shown in FIGS. 1 and 2. Each window 66 includes a lower window edge 68 having a lower window edge profile 70. The lower window edge 68 is disposed adjacent to the upper surface 48 of the commodity tank 18, as best illustrated in FIG. 2. In the illustrated embodiment, at least a portion of the upper surface 48 extends along, corresponds to, follows the contour of, and/or compliments the lower window edge profile 70. The upper surface 48 of the commodity tank 18 is positioned below or is configured to be positioned below the lower window edge 68 of the operator station 14 of the tracked work vehicle 10. Such an arrangement or configuration reduces the likelihood that the commodity tank 18 obstructs the visibility of the operator in the operation station 14 and improves the ability for an operator to access the operator station 14 while the work vehicle 10 utilizes the commodity tank 18 to store material.

As best shown in FIGS. 5 and 6, the inboard portion 28 of the commodity tank 18 includes an inboard surface 72 disposed at the upper end 32 of the inboard portion 28. The inboard surface 72 extends along, corresponds to, follows the contour of, compliments, and/or is shaped for positioning against an exterior surface 74 of the operator station 14 shown in FIG. 1. FIG. 5 further illustrates that the upper surface 48 is configured to extend in an outbound direction from an inbound location 76 adjacent the operator station 14 to an outbound location 78 above the track assembly 16.

As illustrated in FIG. 2, the commodity tank 18 includes one or more pump(s) 64 disposed in one or both of the commodity tank(s) 18 of the vehicle 10. The pump 64 transfers or is otherwise configured to transfer material into the commodity tank 18, out of the commodity tank 18, and/or between commodity tanks 18. In one embodiment, the pump 64 transfers material between the commodity tanks 18 in order to balance the tanks 18. In a further embodiment, the pump 64 transfers material between the commodity tank 18 and a work tool, such as a planter, fertilizer sprayer, nutrient injector, and/or another implement to name non-limiting examples. One will recognize that the commodity tank 18 described herein may include any number of pumps 64 to accomplish functions of the work vehicle 10 and commodity tank 18. Although the pump 64 of the present embodiments is illustrated as being located at or near the rearwardmost end 96 of the commodity tank 18, the pump(s) 64 may be located at any other location within the commodity tank 18. Further, although the pump 64 of the present embodiments is illustrated as being located or positioned inside the commodity tank 18, other embodiments of the present disclosure include the pump(s) 64 being formed integrally with and/or being located outside of the tank 18 in addition to or in lieu of the pump(s) 64 being located inside of the tank 18.

Without in any way limiting the scope, interpretation, or application of the claims appearing below, the work vehicle 10 and the commodity tank 18 of one or more of the embodiments described herein provide a substantial amount of material storage while improving the maneuverability or other operative function of the work vehicle 10 by maintaining a desirable center of gravity of the work vehicle 10 equipped with the commodity tank(s) 18. Further, the commodity tank 18 provides ballast control, improves stability, and/or increases traction of the work vehicle 10 when the commodity tank 18 is positioned in accordance with embodiments described herein because the weight of the commodity tank 18 and the material contained therein is generally centered over the drive axle 60, and such weight and positioning is generally controllable by increasing, decreasing, or displacing material in the commodity tank(s) 18. Even further, because the commodity tank 18 utilizes substantial space at an inboard location of the work vehicle 10, the commodity tank 18 and the work vehicle 10 improve operation of the work vehicle 10 by preventing unnecessary width, length, or other bulk being added to the work vehicle 10 with the addition of the commodity tank 18. The work vehicle 10 and the commodity tank 18 further improve the ability for an operator to access the operator station 14 because the commodity tank 18 is located away from doors or other entry locations of the operator station 14. Even further, the work vehicle 10 and the commodity tank 18 improve an operator's visibility from the operator station 14 because the commodity tank 18 is located away from the window 66.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A work vehicle comprising:
   a work vehicle body;
   at least one track assembly at least partially supporting the work vehicle body and having a track assembly upper profile; and
   at least one commodity tank configured to store material and comprising:
   an inboard portion extending vertically and configured to be positioned at an inboard location of the work vehicle, the inboard portion defining an inboard surface configured to be disposed between the work vehicle body and the at least one track assembly; and an outboard portion extending horizontally from an upper end of the inboard portion and configured to extend at least partially over the at least one track assembly, the outboard portion defining a lower surface configured to face the at least one track assembly and being spaced from above the at least one track assembly along the track assembly upper profile.

2. The work vehicle of claim 1, wherein the at least one track assembly comprises two track assemblies, each of the two track assemblies being disposed on opposite sides of the vehicle body.

3. The work vehicle of claim 2, wherein the at least one commodity tank comprises two commodity tanks, each of the two commodity tanks being disposed on opposite sides of the work vehicle body.

4. The work vehicle of claim 3, wherein the track assembly upper profile comprises a curve having a central peak.

5. The work vehicle of claim 3, wherein the lower surface comprises a lower surface front portion, a lower surface central portion, and a lower surface rear portion, and wherein at least one of the lower surface front portion and the lower surface rear portion is disposed below the lower surface central portion.

6. The work vehicle of claim 3, further comprising at least one drive axle, wherein the at least one drive axle extends through each of the two commodity tanks.

7. The work vehicle of claim 3, further comprising at least one pump disposed in at least one of the two commodity tanks and being configured to transfer material at least one of:
between the two commodity tanks;
into at least one of the two commodity tanks; and/or
out of at least one of the two commodity tanks.

8. The work vehicle of claim 3, further comprising an operator station having at least one lower window edge disposed adjacent to at least one of the two commodity tanks and having a lower window edge profile, wherein an upper surface of the at least one of the two commodity tanks corresponds to the lower window edge profile.

9. The work vehicle of claim 1, wherein the track assembly upper profile is defined by an endless track of the track assembly, the lower surface of the at least one commodity tank being spaced from the endless track along the track assembly upper profile.

10. A commodity tank configured for mounting on a work vehicle and configured for storing material, the commodity tank comprising:
an inboard portion extending vertically and configured to be positioned at an inboard location of the work vehicle, the inboard portion defining an inboard surface configured to be disposed between an operator station and a ground-engaging member of the work vehicle; and
an outboard portion extending horizontally from an upper end of the inboard portion and configured to extend at least partially over the ground-engaging member of the work vehicle, the outboard portion defining a lower surface configured to face an endless track of the ground-engaging member and being spaced from above the ground-engaging member.

11. The commodity tank of claim 10, wherein the inboard portion defines an opening configured to accommodate a drive axle of the work vehicle extending through the inboard portion.

12. The commodity tank of claim 10, wherein the outboard portion extends along an outboard portion profile corresponding to a track assembly upper profile of track assembly of the ground engaging member.

13. The commodity tank of claim 10, wherein the inboard portion comprises an inboard surface disposed at the upper end of the inboard portion, the inboard surface being shaped for positioning against an exterior surface of the operator station.

14. A commodity tank for storing material on an associated tracked work vehicle having a track assembly defining a track assembly upper profile, the commodity tank comprising:
a lower surface configured to face an endless track of the track assembly of the associated tracked work vehicle and being spaced from above the endless track along the track assembly upper profile;
an upper surface configured for mounting adjacent to an operator station of the associated tracked work vehicle; and
an inboard surface configured to be disposed between the endless track and an exterior surface of the operator station of the associated tracked work vehicle.

15. The commodity tank of claim 14, wherein the upper surface of the commodity tank is configured to be positioned below a lower window edge of the operator station of the associated tracked work vehicle.

16. The commodity tank of claim 14, wherein the upper surface of the commodity tank is configured to extend in an outbound direction from an inbound location adjacent the operator station to an outbound location above the track assembly.

17. The commodity tank of claim 14, wherein the lower surface of the commodity tank comprises:
a lower surface front portion,
a lower surface central portion, and
a lower surface rear portion,
wherein at least one of the lower surface front portion and the lower surface rear portion is disposed below the lower surface central portion.

18. The commodity tank of claim 17, wherein the lower surface front portion of the commodity tank is configured to be spaced from the endless track along a front portion of the track assembly.

19. The commodity tank of claim 17, wherein the lower surface central portion of the commodity tank is configured to be spaced from the endless track along an upper portion of the track assembly.

20. The commodity tank of claim 17, wherein the lower surface rear portion of the commodity tank is configured to be spaced from the endless track along a rear portion of the track assembly.

21. The commodity tank of claim 14, wherein:
the inboard surface is defined on an inboard portion of the commodity tank configured to be positioned at an inboard location of the associated tracked work vehicle; and
the lower surface is defined on an outboard portion of the commodity tank extending horizontally from an upper end of the inboard portion and configured to extend at least partially over the endless track of the track assembly of the associated tracked work vehicle.

* * * * *